US010060000B2

(12) United States Patent
Mašek et al.

(10) Patent No.: US 10,060,000 B2
(45) Date of Patent: Aug. 28, 2018

(54) METHOD OF HOT FORMING HYBRID PARTS

(71) Applicant: Západočeská univerzita v Plzni, Plzen (CZ)

(72) Inventors: Bohuslav Mašek, Kaznějov (CZ); Hana Jirková, Plzeň (CZ); Filip Vančura, Zlín (CZ); Ctibor Štádler, Plzeň (CZ); Dagmar Bublíková, Plzeň (CZ)

(73) Assignee: Západočeská univerzita v Plzni (CZ)

( * ) Notice: Subject to any disclaimer, the term of this patent is extended or adjusted under 35 U.S.C. 154(b) by 342 days.

(21) Appl. No.: 14/979,124

(22) Filed: Dec. 22, 2015

(65) Prior Publication Data

US 2016/0177410 A1    Jun. 23, 2016

(30) Foreign Application Priority Data

Dec. 23, 2014    (CZ) .................... 2014-955

(51) Int. Cl.
| C21D 1/00 | (2006.01) |
| C21D 8/00 | (2006.01) |
| C22C 21/00 | (2006.01) |
| C22C 38/48 | (2006.01) |
| C22C 38/44 | (2006.01) |
| C22C 38/06 | (2006.01) |
| C22C 38/04 | (2006.01) |
| C22C 38/02 | (2006.01) |
| C22C 38/00 | (2006.01) |
| C22C 21/10 | (2006.01) |
| C22F 1/053 | (2006.01) |
| C22F 1/04 | (2006.01) |
| C22F 1/00 | (2006.01) |
| C21D 6/00 | (2006.01) |
| C21D 1/613 | (2006.01) |
| C21D 7/13 | (2006.01) |
| C21D 9/00 | (2006.01) |
| B32B 15/01 | (2006.01) |
| C22C 23/02 | (2006.01) |
| C22C 38/58 | (2006.01) |

(52) U.S. Cl.
CPC ............ *C21D 8/005* (2013.01); *B32B 15/012* (2013.01); *B32B 15/013* (2013.01); *C21D 1/613* (2013.01); *C21D 6/004* (2013.01); *C21D 6/005* (2013.01); *C21D 6/008* (2013.01); *C21D 7/13* (2013.01); *C21D 9/00* (2013.01); *C22C 21/00* (2013.01); *C22C 21/10* (2013.01); *C22C 23/02* (2013.01); *C22C 38/002* (2013.01); *C22C 38/02* (2013.01); *C22C 38/04* (2013.01); *C22C 38/06* (2013.01); *C22C 38/44* (2013.01); *C22C 38/48* (2013.01); *C22C 38/58* (2013.01); *C22F 1/002* (2013.01); *C22F 1/04* (2013.01); *C22F 1/053* (2013.01)

(58) Field of Classification Search
CPC .................. C21D 1/18; C21D 8/005
See application file for complete search history.

(56) References Cited

U.S. PATENT DOCUMENTS

| 2012/0137498 A1* | 6/2012 | Lenze ...................... C21D 1/18 29/460 |
| 2016/0067763 A1* | 3/2016 | Graff .......................... B21B 1/38 29/894.35 |
| 2016/0177410 A1* | 6/2016 | Masek ................... C21D 8/005 148/654 |

FOREIGN PATENT DOCUMENTS

| CA | 2556869 A1 | 2/2008 |
| CA | 2759154 A1 | 5/2013 |

* cited by examiner

*Primary Examiner* — Scott R Kastler
(74) *Attorney, Agent, or Firm* — Hovey Williams LLP; Joan Herman

(57) ABSTRACT

A method of hot forming hybrid parts wherein side-by-side with a thin-walled piece of steel stock, which has been heated to austenite temperature, another piece of stock of another formable metal is placed, The processing temperature of this formable metal corresponds to the temperature at which quenching of the steel stock is interrupted within an interval between the $M_s$ and $M_f$ temperatures. The steel stock and formable metal are then formed together, while the temperature decreases to a temperature which is close to the forming tool temperature. Next, the resulting semi-finished product is cooled to the ambient temperature.

12 Claims, No Drawings

METHOD OF HOT FORMING HYBRID PARTS

FIELD OF THE INVENTION

The present invention relates to a method of hot forming hybrid parts where one of the components of the hybrid part is a piece of steel stock of AHS steel and the other component is of another metallic material.

BACKGROUND OF THE INVENTION

A majority of parts manufactured by forming are still made of a single material. A typical example related to the use of steel is a hot closed-die forging process, wherein steel stock is heated to the forming temperature, transferred to a forging die and deformed consecutively at individual stations of the progressive die so that it fills the die cavities. This forging is then trimmed, sized and cooled or subsequently heat treated. Where advanced high strength (AHS) steels are used, the microstructure must be modified by heat treatment of thermomechanical processing in order to obtain final martensitic microstructure with retained austenite. This process requires rapid cooling from the austenite temperature to a region between the $M_s$ and $M_f$ temperatures. The cooling is interrupted within the said temperature interval and followed by isothermal holding, which is necessary for stabilizing retained austenite at a temperature which is typically somewhat higher than the temperature at which quenching was interrupted. Within several minutes, the retained austenite is stabilized by carbon diffusion, which provides the steel with high strength and good ductility. In this processing method, it is necessary to interrupt cooling at a particular temperature which is relatively demanding to accomplish in practice. Formed parts of this kind can be manufactured from sheet stock by deep drawing followed by heat treatment of the aforementioned type. The resulting part shows high strength and, thanks to its structural configuration, sustains high loads up to the moment when it becomes unstable and, consequently, destroyed. The destruction takes the form of a collapse of the part's structure due to overload. If solid material is used, the structure does not tend to collapse equally easily but there is a disadvantage of the relatively high weight of such part and of higher manufacturing cost of the formed part.

For instance, the known document no. CA 02759154 describes synthetizing of high-thermal-conductivity hybrid materials from two groups of metallic materials: the first group comprises aluminium, magnesium and zirconium alloys and the other contains stainless, carbon or tool steels and nickel and titanium alloys. The base materials from the first group exhibit much higher thermal conductivity than the base materials from the second group. The hybrid materials contain a layer of oxides based on these metallic elements. These oxides are synthetized using plasma oxidation, as described in the document no. CA 2556869.

SUMMARY OF THE INVENTION

The above-described drawbacks of hot-formed parts are eliminated by a method of manufacturing characterized in that steel stock of a suitable steel is formed together with another material whose forming temperature corresponds to the temperature at which quenching is interrupted and at which mixed hardening microstructure with austenite is formed. During hot plastic deformation, thin-walled stock of AHS steel comes into contact and, as a result of the contact, the steel cools to the temperature to which the other material has been heated, whereby a hybrid structure is formed, the surface layer of which consists of the AHS steel and whose core consists of the other material, e.g. an aluminium alloy. By this, high stability of the structural configuration is achieved, as the aluminium alloy core prevents the destruction of the thin-walled high-strength steel structure due to structural instability. The heat energy accumulated in the aluminium alloy is transferred to the surroundings via the AHS steel surface layer. Hence, retained austenite in this steel becomes stabilized, as the carbon present in supersaturated martensite diffuses to austenite. By this method, various hybrid structures of the following types can be manufactured: a closed-die forging, bar, tube, or an extruded part. In all cases, the result is a formed semi-finished product or a part whose surface consists of a high-strength steel layer of sufficient strength and whose interior is filled with another material, e.g. an aluminium alloy. This structure is considerably more lightweight and substantially more stable than a part manufactured of only one of the materials.

EXAMPLE EMBODIMENT

Example 1

Bar stock of AlMn1 aluminium alloy (Tab. 2) heated to 200° C. is inserted into tube stock of 42SiCr steel (Tab. 1) heated to a forming temperature of 950° C. As there is no direct contact between the two pieces of stock, there is no heat transfer by conduction. The stock prepared in this manner is reduced by rolling so that the diameter is reduced and the wall of the steel comes into contact with the aluminium alloy bar. A part of the energy is transferred to the aluminium alloy bar whose temperature thus increases to 270° C. At the same time, martensite and retained austenite form in the steel stock. At the same time, the deformed location is being cooled to prevent local overheating caused by plastic deformation. The process control is adjusted so that the tube temperature decreases at a rate of 20° C./s to 250° C. At this temperature, the temperatures of the tube and of the bar become equal on the contact surface and consequently the cooling stops. Afterwards, the bar is placed into a thermal insulation container which enables holding at approximately 250° C. for approximately 5 minutes and then slow cooling of this formed product. As heat is transferred from the bar to the tube and then to the surroundings, austenite becomes stabilized in the temperature range between 200° C. and 300° C. The result is a hybrid part, on the surface of which there is high-strength steel which is able to sustain stresses up to 2000 MPa and shows an elongation of more than 10%. In bending or under overload, this shape does not lose stability as quickly as if it were a hollow product.

TABLE 1

Chemical composition of 42SiCr steel in wt. %

| C | Si | Mn | Cr | Mo | Al | Nb | P | S | Ni |
|---|----|----|----|----|----|----|----|----|----|
| 0.43 | 2.03 | 0.59 | 1.33 | 0.03 | 0.008 | 0.03 | 0.009 | 0.004 | 0.07 |

TABLE 2

| Chemical composition of AlMn1 alloy in wt. % | | | | | | |
|---|---|---|---|---|---|---|
| Cu | Cr | Fe | Mg | Mn | Si | Zn |
| 0.1 | 0.1 | 0.7 | 0.3 | 1.5 | 0.5 | 0.2 |

Example 2

Between two pieces of stock which take the form of drawn sheet metal parts of 42SiCr steel (Tab. 1) and which have been heated to 950° C., a preformed piece of stock of MgAl3Zn magnesium alloy (Tab. 3) is placed which has a temperature of 200° C. and a shape close to the internal shape of the drawn sheet metal parts. These pieces of stock are then placed into a die and formed together so that the shaped surfaces of the sheet metal stock come into perfect contact with the forming tool, i.e. the cavity of the forging die, and, at the same time, the sheet metal inner surfaces come into contact with the stock of the magnesium alloy. Thanks to the temperature of the forging die which is 150° C., the steel cools and, at the same time, its temperature decreases to 200° C. in contact with the magnesium preformed stock. Owing to the heat energy accumulated in the preformed magnesium stock, the cooling of the drawn steel sheet parts stops and, after temperature equalization, the forging is transferred to a tempering chamber where it is held at 200° C. for 10 minutes or subsequently cooled in cooling equipment. In this manner, a hybrid forging is produced, whose surface exhibits high strength, which has good ductility and where, thanks to the filled interior of the formed part, high stability at low weight is provided.

TABLE 3

| Chemical composition of MgAl3Zn alloy in wt. % | | | | | |
|---|---|---|---|---|---|
| Al | Zn | Mn | Fe | Ni | Si |
| 3.50 | 1.50 | 0.10 | 0.003 | 0.05 | 0.10 |

Example 3

Tube-shaped stock of 42SiCr (Tab. 1) steel heated to the forming temperature of 930° C. and bar stock of AlMn1 (Tab. 2) magnesium alloy heated to 260° C. are placed together into a cross-extrusion die which is held at 180° C. This takes place in a protective atmosphere in the absence of air. Immediately thereafter, the material is compressed and converted to a plastic state by a movement of two approaching pistons. Plastic deformation causes a collar to form, the shape of which is dictated by the mould cavity. Thanks to the cooling ability of the mould, the steel's temperature decreases to 200° C. in direct contact with the mould wall. At this temperature, the semi-finished product is removed from the mould and placed into a tempering box where the heat accumulated in the magnesium alloy is gradually transferred to the steel. The steel's temperature thus rises to 240° C. The semi-finished product is then held for 10 minutes at this temperature, after which it is removed from the box and cools in still air to the ambient temperature.

INDUSTRIAL UTILITY

The invention can be widely used in the field of processing semi-finished products by forming, especially in the production of parts which are intended to sustain high stresses and which, at the same time, must not have large weight.

The invention claimed is:

1. A method of hot forming hybrid parts, the method comprising the steps of:
   heating a thin-walled steel stock to an austenite temperature level such that the thin-walled steel stock enters an austenitic state;
   quenching the thin-walled steel stock;
   placing at least one of the thin-walled steel stock and a piece of stock of another formable metal in a forming tool;
   positioning the thin-walled steel stock and the piece of stock of the other formable metal side-by-side while the thin-walled steel stock is in the austenitic state and a temperature of the piece of stock of the other formable metal is at a temperature level such that quenching of the thin-walled steel stock is interrupted within an interval between $M_s$ and $M_f$ temperature levels so that the thin-walled steel stock and the piece of stock of the other formable metal are formed together resulting in a semi-finished product;
   decreasing a temperature of the semi-finished product such that heat is not transferred from the semi-finished product to the forming tool; and
   decreasing the temperature of the semi-finished product to an ambient temperature level.

2. A method of hot forming hybrid parts according to claim 1, wherein the thin-walled steel stock and the piece of stock of the other formable metal are positioned side-by-side in the absence of air.

3. A method of hot forming hybrid parts according to claim 1, wherein the thin-walled steel stock and the piece of stock of the other formable metal are positioned side-by-side in a protective atmosphere.

4. A method of hot forming hybrid parts according to claim 1, further comprising the steps of removing the semi-finished product from the forming tool and processing the semi-finished product according to a thermal schedule comprising holding the temperature of the semi-finished product at a temperature level in the range of 200° C.-250° C. for 5-10 minutes.

5. A method of hot forming hybrid parts according to claim 1, wherein the forming tool is a closed die.

6. A method of hot forming hybrid parts according to claim 1, further comprising the step of at least partially forming the semi-finished product via extrusion.

7. A method of hot forming hybrid parts, the method comprising the steps of:
   heating a steel stock to an austenite temperature level such that the steel stock enters an austenitic state;
   quenching the steel stock;
   placing at least one of the steel stock and a piece of stock of another formable metal in a forming tool;
   positioning the steel stock and the piece of stock of the other formable metal side-by-side while the steel stock is in the austenitic state and a temperature of the piece of stock of the other formable metal is at a temperature level such that quenching of the steel stock is interrupted within an interval between $M_s$ and $M_f$ temperature levels so that the steel stock and the piece of stock of the other formable metal are formed together resulting in a semi-finished product;
   decreasing a temperature of the semi-finished product such that heat is not transferred from the semi-finished product to the forming tool; and decreasing the temperature of the semi-finished product to an ambient temperature level.

8. A method of hot forming hybrid parts according to claim 7, wherein the steel stock and the piece of stock of the other formable metal are positioned side-by-side in the absence of air.

9. A method of hot forming hybrid parts according to claim 7, wherein the steel stock and the piece of stock of the other formable metal are positioned side-by-side in a protective atmosphere.

10. A method of hot forming hybrid parts according to claim 7, further comprising the steps of removing the semi-finished product from the forming tool and processing the semi-finished product according to a thermal schedule comprising holding the temperature of the semi-finished product at a temperature level in the range of 200° C.-250° C. for 5-10 minutes.

11. A method of hot forming hybrid parts according to claim 7, wherein the forming tool is a closed die.

12. The method of claim 7, further comprising the step of at least partially forming the semi-finished product via extrusion.

\* \* \* \* \*